United States Patent [19]

Morgan et al.

[11] 4,010,103
[45] Mar. 1, 1977

[54] AUTOMATIC OIL-WATER SEPARATING DEVICE

[76] Inventors: Jerry E. Morgan, 352 67th St., Clarendon Hills, Ill. 60514; William M. Lynch, 621 Western Ave., Glen Ellyn, Ill. 60137; Paul M. Pelton, 1209 South Gates, West Chicago, Ill. 60185

[22] Filed: Aug. 12, 1974

[21] Appl. No.: 496,515

[52] U.S. Cl. .................... 210/242 R; 210/DIG. 25
[51] Int. Cl.² .................................... E02B 15/04
[58] Field of Search ............. 210/83, 242, DIG. 21

[56] References Cited

UNITED STATES PATENTS

| | | |
|---|---|---|
| 2,608,300 | 8/1952 | Small ................................ 210/242 |
| 2,661,094 | 12/1953 | Stewart ............................. 210/242 |
| 3,682,316 | 8/1972 | Waren .............................. 210/242 |
| 3,702,134 | 11/1972 | Henning, Jr. ..................... 210/242 |
| 3,706,382 | 12/1972 | Cross ............................... 210/242 |
| 3,727,765 | 4/1973 | Henning, Jr. et al. ............. 210/242 |
| 3,849,308 | 11/1974 | Westermann ..................... 210/242 |
| 3,909,417 | 9/1975 | Rafael .............................. 210/242 |

*Primary Examiner*—Theodore A. Granger
*Attorney, Agent, or Firm*—Hill, Gross, Simpson, Van Santen, Steadman, Chiara & Simpson

[57] ABSTRACT

An automatic oil-water separating device used within an oil-water separating container for skimming the oil off the top of the water and directing same through a collecting conduit to an associated container. The device includes a skimming trough supported by first floatation means mounted on opposite sides of the trough, and a second floatation means transversely disposed to the trough. The specific shape of both the first and second floatation means is designed to immediately restore the trough to the skimming position in the event the unit is accidentally submerged below the surface of the water and to automatically pivot the unit to accelerate oil separation.

8 Claims, 5 Drawing Figures

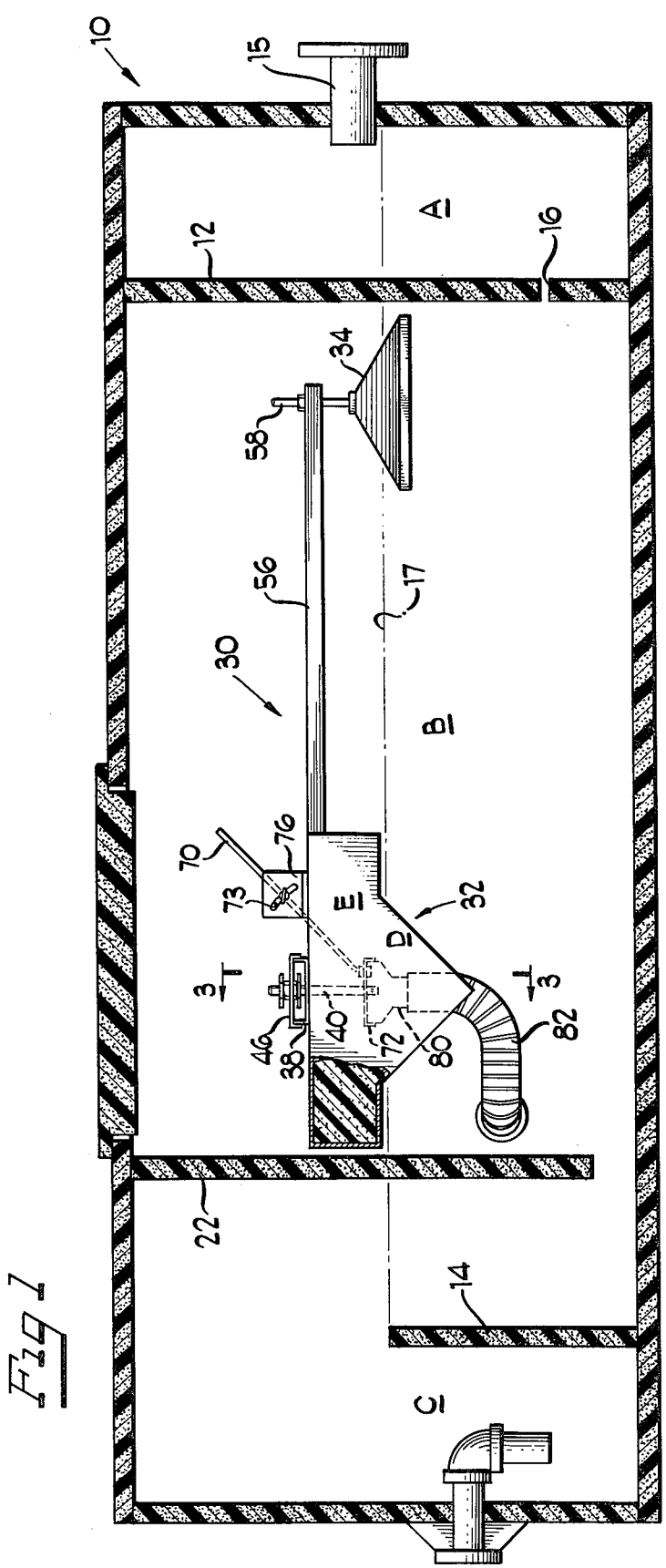
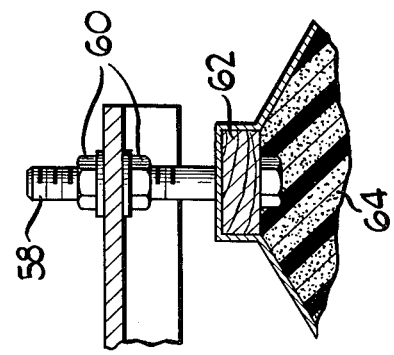
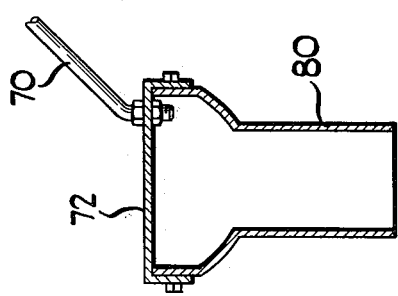

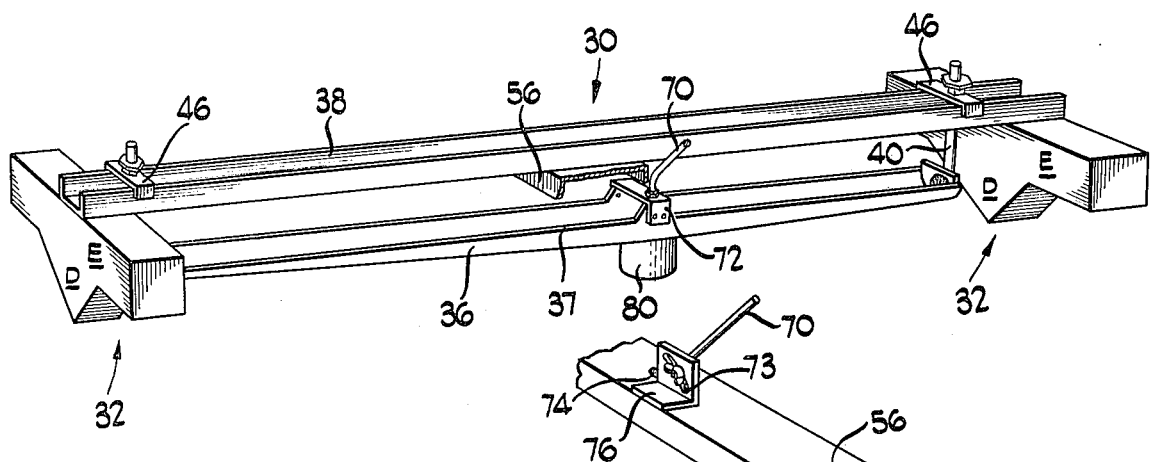
Fig 2
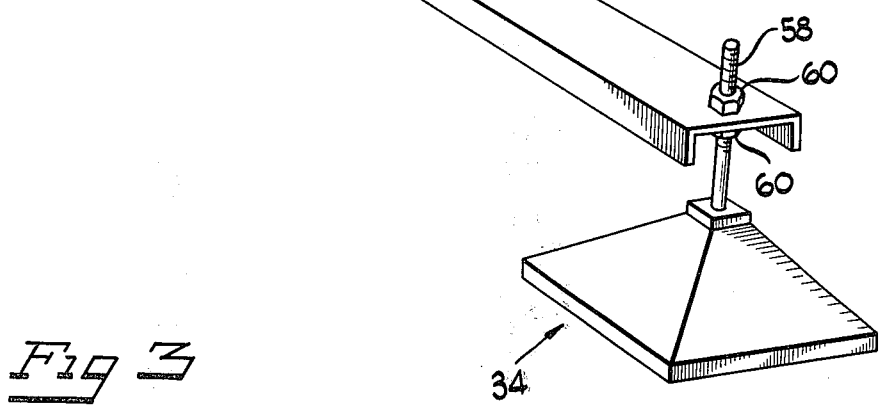
Fig 3
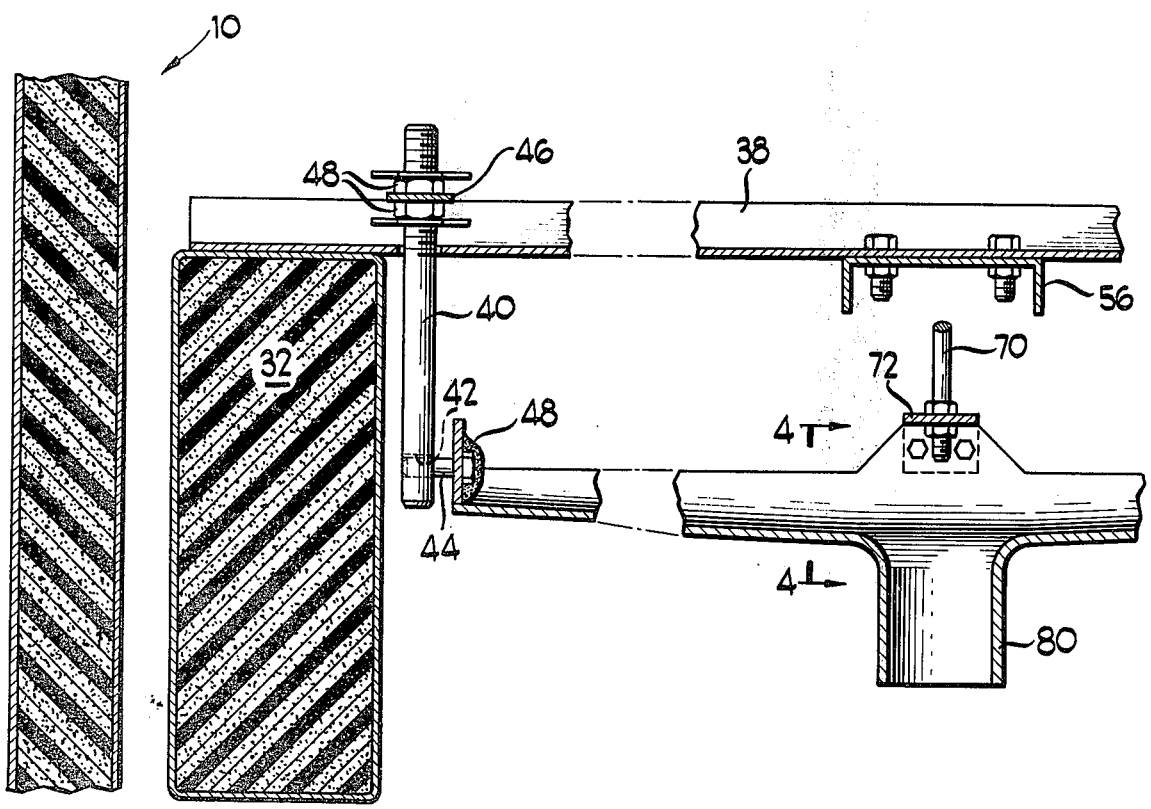

AUTOMATIC OIL-WATER SEPARATING DEVICE

BACKGROUND OF THE INVENTION

This invention relates to an automatic oil-water separating device adapted to be used in oil-water separating tanks. Illustrative of such tanks is that disclosed in copending application filed June 11, 1973 by Stirling W. Pelton and William M. Lynch for Container Structure having a Ser. No. 368,850 now U.S. Pat. No. 3,904,524 issued Sept. 9, 1975. These tanks are normally installed underground for receiving an oil-water mixture collected from spillage areas usually associated with oil storage depots and refinery areas. The oil mixture flows to a separating chamber within the tank at which time the oil, being lighter than water, floats to and collects on the surface of the water with the latter flowing on through the tank and being subsequently discharged.

Various devices for skimming the oil from the surface of the water have been utilized in the prior art. One such device is disclosed in the copending patent application referred to above.

However, such devices do not necessarily incorporate the desirable features of the oil-water skimming device disclosed herein. These desirable features include:

1. a floatation unit which continuously adjusts the separating trough to the water level even under surge conditions;
2. a unit with high efficiency, having the ability to maintain the amount of oil upon the water at a very low level and which begins its separating function upon the slightest build-up of oil; and
3. a unit which is capable of rapidly restoring itself to a separating position in the event it is accidently submerged underneath the water.

SUMMARY OF THE INVENTION

In order to obtain these desired advantages, the instant invention includes an oil skimming trough whose position relative to the water level is determined by two floatation means. Preferably, the first floatation means includes two floats which are mounted at opposite ends of the trough, each of these floats having two sections. The lower section of each float has a primary purpose of positioning the trough relative to the water surface. The second section is mounted on top of the first section and has a substantially larger displacement to rapidly restore the unit to a skimming position after being dunked. The second floatation means comprises another float unit transversely displaced from and connected to the skimming trough. The first section of the float units on each side of the trough and the second floatation means has a construction which defines a variable displacement causing the trough to pivot about its longitudinal axis to provide improved skimming action as subsequently described. Accordingly, an object of this invention is to provide an automatic oil-water separator which accomplishes the desirable features identified above. Another object is to provide such an oil separator which is inexpensive to manufacture and is easy to regulate to accomplish the desired purpose.

DESCRIPTION OF THE DRAWINGS

The manner in which the above objects are attained will be made clear by reference to the following specifications and to the drawings, in which:

FIG. 1 is a side elevational view of a preferred embodiment of our invention disclosed in its conventional environment of an oil-water separating tank;

FIG. 2 is a perspective view of the preferred embodiment of our invention;

FIG. 3 is a side elevational view of a portion of the preferred embodiment of our invention taken along the lines 3—3 of FIG. 1;

FIG. 4 is a side elevational view taken of the oil-water separating trough taken along the lines 4—4 of FIG. 3; and FIG. 5 is a side elevational view of the second floatation means of our invention with portions broken away.

DETAILED DESCRIPTION

The preferred embodiment and its intended environment is shown in FIG. 1. Such depicts the oil skimming apparatus 30 within an oil-water separating tank 10 usually employed adjacent large oil storage areas or facilities. A preferred tank construction is disclosed in copending application Ser. No. 368,850 referred to above and is divided into chambers by partitions 12 and 14 extending across the container 10. The first partition 12 defines an inlet chamber A which receives an oil-water mixture through an inlet conduit 15 connected to a drainage area. The mixture then passes out of this chamber through an aperture 16 in partition 12 into an oil-water separating chamber B. This latter chamber is usually quite large, requiring the oil-water mixture to pass a substantial distance before the water reaches partition 14 and outlet chamber C. This substantial distance and the relatively small flow rates permits the oil to separate out of the water and to be accumulated on top of the water level (indicated by the dash mark 17) for separation from the tank by the invention of this application. The water level 17 is maintained by the partition 14 whose height determines the height of the water within the chamber B. As additional oil-water solution enters the tank, such forces the water to flow over the partition 14 and into the outlet chamber C from which it is removed by an outlet conduit 20. Another partition 22 extending across the width of the oil-water separator tank causes the oil to be held within the separating chamber B as the water passes underneath. As it is accumulated, the oil passes into a skimming trough (subsequently described), which delivers the fluid to an outlet conduit for subsequent collection.

Referring now to FIGS. 1 and 2, the preferred embodiment of our invention may be better understood. As previously disclosed, a floatation skimmer should have an ability to float on the water, and to rise and fall with surges of fluid entering the inlet conduit 15. Floatation means 32 and 34 accomplish this function by supporting the skimming or oil collecting trough 36 above water level 17. As shown in FIG. 2, the first floatation means 32 preferably includes two identical units at opposite sides of the skimming trough 36, these units being held together by a U-shaped supporting member 38. The second floatation means 34 is supported transversely to trough 36 by a connecting member 56. As subsequently described, the cross-sectional shape of both floatation means 32 and 34 affect the ability of the unit to restore itself after being dunked and to accelerate the rate of skimming. For example, floatation means 32 may be considered as formed of two sections, D and E, the section E being normally supported above the water level. In the event the unit is submerged, the larger displacement of Unit E results in a larger buoyant force seeking to restore the unit to the floating condition. Additionally, and as will be subsequently described, the particular shapes of section D, and floatation unit 34 effect a pivoting action of the skimmer unit such that the skimming edge 37 of the skimming trough will be pivoted closer or further away from the water level as the level of oil on top of the water increases or decreases.

Referring now to FIGS. 2 through 5, the details of our invention can be understood. First, the floatation means 32 preferably comprises two float units formed of a closed cell, rigid, polyurethane foam board commercially available. Each unit is cut from the board in the configuration shown in FIG. 1. Thus, the first or lower section D is V-shaped and extends upwardly to join the rectangular section E. The units are then sprayed with any acceptable waterproof solution such as a polyester resin, or a gel coat, and are bonded together by an elongate structural member taking the form of a U-shaped cross channel 38 which may be formed of matted fiber glass, immersed into a thermosetting plastic resin, formed and cured into the shape depicted in this drawing.

In addition to joining floatation units 32, the cross support 38 in turn supports the automatic skimming trough 36 as shown in FIG. 3. Here a bolt 40 extends downwardly through the support member 38 and is provided with a cross bore 42 to loosely receive a bolt 44 affixed to the end of a generally U-shaped trough 36. The top of the bolt 40 is secured to the cross support 38 by a U-shaped bracket member 46 which is mounted on top of the flanges of the support 38. Nuts 48—48 are positioned above and below this U-shaped bracket member 46 so as to permit adjustment of the level of the trough 36 with respect to the support member 38 and the water level.

Thus, as seen from FIG. 2, both ends of the trough 36 are mounted for pivotal action about the bolts 44. These bolts may be affixed to the trough by applying to the ends thereof a thermosetting plastic as shown at 48. Thus, not only is the trough 36 free to pivot in the absence of constraint subsequently described, but its vertical position relative to the water surface can be adjusted by the bolts 40 at opposite ends of the support member 38.

The skimming trough itself may be formed of a fiber glass mat impregnated with a thermosetting resin solution. After impregnation, it is then formed into the configuration shown and permitted to cure such that the leading edge defines a horizontal skimming edge 37.

The attitude of this skimming edge 37 is partially determined by an elongate arm which may comprise the second floatation means 34. This unit is affixed to the automatic skimming device by another support member 56 whose forward end is bolted to the cross support member 38 as shown in FIG. 3 and extends rearwardly therefrom in a direction perpendicular to the cross support 38. Preferably, the second support member 56 is also formed of a matted fiber glass impregnated with a thermsetting resin and cured in the configuration shown. At the rear end of the member 56 is a bolt 58 secured thereto by upper and lower nuts 60. The bolt extends downwardly to mount float unit 34. A block of wood 62 is mounted on bolt 58 adjacent its head to securely carry a polyurethane board 64 having a four-sided frusto-conical shape. A thermosetting resin applied to the wood and the polyurethane board secures these units together.

This second floatation means keeps the trough 36 in a generally horizontal position. However, its skimming edge 37 may be adjusted relative to the water level by a positioning rod 70 which is rigidly secured to a U-shaped member 72 mounted upon opposite sides of the trough 36 near its center. This positioning rod 72 then extends upwardly through a slot 74 in support member 56 adjacent a positioning plate 76. This positioning plate 76 is an L-shaped member having a slot 73 in its vertical plate therein to receive a bolt carried by rod 70 while a winged nut rigidly clamps the positioning rod at a given attitude relative to the skimming unit 30. Thus, rotation of the positioning rod 70 will generally raise or lower the skimming edge 37 of the trough 36 relative to the water level 16. As water enters over the skimming edge 37 of the trough 36, it flows to the center of that trough and may egress through an outlet into a conduit 80 which is connected to a flexible conduit 82 in turned joined to an L which extends through the sidewall of the oil-water separator tank. Preferably, the L is further connected to an oil collecting tank outside the separator.

In the installation of the unit 30, it is placed into the separator tank on top of the water 17. The trough 36 is positioned just above the water level by adjustment of the nuts 48—48 on bolt 40. Then the forward edge of the trough 37 is adjusted by the use of the positioning rod 70 so as to be positioned approximately three-eighths of an inch above the water surface.

During operation, the specific configurations of the first and second floatation units 32 and 34 become important. First, the buoyant forces acting upwardly upon section D of floatation unit 32, trough 36, and upon the second floatation unit 34 should be sufficient to keep the large section E of first floatation means approximately one-half inch out of the water, and the trough edge 37 approximately three-eighths of an inch above the water. Now, should the unit be accidentally submerged by someone stepping on it or by an immediate surge of water through the inlet conduit 15, the large displacement of section E will rapidly restore the unit to the skimming position. Such provides one important functional aspect of our invention. Now consider the V-shaped section D of the first floatation means. Its volumetric displacement of water or oil varies in direct proportion to a power of the depth which it sets in the water or oil. Thus, its buoyant force increases as the depth of liquid increases in accord with the equation $F = k(d^{f(d)})$ where $F$ is the upward buoyant force, $k$ is a constant, $d$ is the depth of submersion of section D and $f(d)$ is a number greater than 1. However, since the oil is lighter than water, the buoyant force on section D resulting from any accumulation of oil will cause the trough to float higher relative to the water level but lower relative to the surface of the accumulated oil. Such permits faster skimming-separation of oil.

Additionally, the second floatation means 34 further enhances a faster rate of skimming by reason of its specific structure. This second floatation means will float proportionally deeper in accumulated oil causing edge 37 of trough 36 to pivot about its longitudinal axis. This result occurs because the volumetric displacement of and the buoyant force exerted upon this second floatation means varies in proportion to the depth of float 34 in the accumulated oil in accord with the equation $F=k(d)^{f(d)}$ where $F$ is the force exerted on the float; $k$ is a constant, $d$ is the depth at which float 34 sits in the oil-water mixture and $f(d)$ is any number less than 1. Thus, as the oil level on top of the water increases, the second floatation means 34 will also rise, but substantially less than that of the first floatation means. This causes the entire unit to pivot clockwise, moving the edge 37 of the skimmer trough 36 nearer to the water. Obviously, such causes skimming action to commence very quickly and to continue at an accelerated rate. Subsequently as most of the oil is skimmed off of the water level 17, the unit will pivot in a counterclockwise manner with the unit 34 rising relative to the floatation means 32.

Accordingly, applicants have disclosed a unique automatic skimming device which automatically pivots to enhance skimming action upon an increase of oil in the oil-water separating tank. Various substitutes for the materials specifically disclosed will be appreciated by those skilled in the art. Further, the specific configuration of both the first and the second floatation means are relatively unimportant, except to the extent that they have to conform to the formulas identified above, and support the trough 36 in the manner generally described. The edge 37 of the trough 36 may take various configurations depending upon its application. It may have a sawtooth construction, or have a radius coated with a low friction material to minimize the surface tension effects.

We claim:

1. Apparatus for skimming a lighter liquid floating on the surface of a more dense liquid, said apparatus comprising:
    an elongate structural member supported by first float means located at each end thereof,
    each of said first float means consisting of a shape comprising a greater volumetric displacement means in its upper portion as compared to its lower portion,
    a U-shaped skimming trough having a horizontal skimming edge,
    said trough being pivotably supported from said structural member along its elongate length,
    an elongate arm with a first end connected to the central portion of said elongate structural member and extending at right angles to the central axis of said skimming trough,
    means adjustably connecting said arm near said first end to the central portion of said U-shaped skimming trough and being constructed and arranged to dispose said arm approximately in the same horizontal plane as the horizontal skimming edge of said U-shaped trough,
    second float means adjustably connected to a second end of said elongate arm,
    said second float means consisting of a shape comprising a greater volumetric displacement means in its lower portion as compared to its upper portion,
    and said skimming trough having formed in its lowermost portion an outlet through which lighter liquid skimmed into the trough over the horizontal skimming edge is removed to a separate location.

2. Apparatus as defined in claim 1 wherein said first float means has a structure such that the buoyant force exerted by the liquid thereon varies in proportion to the depth of the flotation means within the liquid in accord with the equation $F = k(d)^{f(d)}$ where $F$ is the buoyant force, $k$ is a constant, and $d$ is the depth of the flotation means within the water and $f(d)$ is greater than 1.

3. Apparatus as defined in claim 1 wherein said second float means has a structure such that the bouyant force exerted by the liquid thereon varies in accord with the equation $F = k(d)^{f(d)}$ where $F$ is the bouyant force, $k$ is the constant, $d$ is the depth of the flotation means within the liquid, and the $f(d)$ is less than 1.

4. Apparatus as defined in claim 3 wherein said second float means more particularly comprises a square base portion, an upper four-sided frusto-conical-shaped portion attached to said base, and a threaded stud carried vertically above said upper portion and adjustably connected to a second end portion of said elongate arm.

5. Apparatus as defined in claim 2 wherein said first float means more particularly comprises a first enlarged upper bouyant body of rectangular configuration and a second reduced lower bouyant body depending therefrom of a V-shaped configuration.

6. Apparatus as defined in claim 1 wherein said first and second float means each comprise a closed cell polyurethane foam coated with a waterproof solution, and said structural member, said trough and said arm comprise articles made of a matted fiberglass impregnated with a thermosetting resin solution.

7. Apparatus as defined in claim 1, said means adjustably connecting said trough to said arm comprising a positioning rod projecting generally upwardly and forwardly of the skimming edge of said trough and extending through a slot formed in said arm,
    and a slotted positioning plate carried by said arm and in which slot a locking bolt connected to said positioning arm is selectively positioned and clamped, thereby to adjustably preset the attitude of the skimming edge of said skimming trough.

8. Apparatus as defined in claim 1,
    said skimming trough being pivotally supported by adjustable positioning rods connected to said elongate structural member and said rods being selectively adjustable to position the skimming trough relative to the water surface.

* * * * *